United States Patent [19]

Muto et al.

[11] Patent Number: 4,713,979
[45] Date of Patent: Dec. 22, 1987

[54] TRANSMISSION WITH REVERSE MECHANISM

[75] Inventors: Osamu Muto, Tokyo; Masanori Masumura; Yoshiaki Hori, both of Saitama, all of Japan

[73] Assignee: Honda Giken Kogyo Kabushiki Kaisha, Tokyo, Japan

[21] Appl. No.: 946,359

[22] Filed: Dec. 24, 1986

[30] Foreign Application Priority Data

Dec. 27, 1985 [JP] Japan .................. 60-294707

[51] Int. Cl.$^4$ .............................. F16H 5/06
[52] U.S. Cl. ......................... 74/337.5; 192/51; 192/93 R
[58] Field of Search .............. 74/337.5; 192/51, 93 R, 192/94

[56] References Cited

U.S. PATENT DOCUMENTS 4,455,884  6/1984  Tsuruta et al. .............. 74/337.5 X
4,635,506  1/1987  Imaizumi et al. ............ 74/337.5 X Primary Examiner—Leslie Braun
Assistant Examiner—Dirk Wright
Attorney, Agent, or Firm—Lyon & Lyon

[57] ABSTRACT

A transmission includes a forward shift drum and an overlying and coaxial reverse shift drum. The drums are rotatable, but not longitudinally translatable with respect to each other. The drums each include lead grooves for guiding a shift fork pin therealong in portions of the grooves which overlap and intersect each other. When one of the lead grooves guides the shift fork pin into a gear position, the other lead groove serves as a stop, so that unintentional engagement of remaining gears with the drive shaft is prevented without the use of a separate special lock mechanism.

6 Claims, 5 Drawing Figures

TRANSMISSION WITH REVERSE MECHANISM

BACKGROUND OF THE INVENTION

The field of the present invention is transmissions having a reverse mechanism. In conventional transmissions having a reverse mechanism for use in motorcycles, saddle type three-wheeled vehicles, etc., a forward shift drum rotated by a first operating element and a reverse shift drum rotated by a second operating element are separately supported within the transmission. Upon rotation of each of these forward and reverse shift drums, shift forks engage in lead grooves in the outer peripheral surface of the drums, so that forward and reverse gears are brought into driving engagement with a drive shaft via shifters integrally mounted to the shift forks.

However, in such conventional transmissions, the reverse mechanism generally includes a lock mechanism to prevent the reverse gear from accidentally being engaged to the drive shaft, when a forward gear is driven. This lock mechanism results in an increase in size, weight, and complexity of the transmission. In addition, the fact that the two shift drums are separately supported within the transmission also requires an increased size of the transmission.

SUMMARY OF THE INVENTION

The present invention is directed to a transmission having a reverse mechanism which integrally includes means for preventing unintended or accidental gear engagement to the drive shaft. To this end, a transmission with a reverse mechanism includes a forward shift drum rotatable by a first operating element. A reverse shift drum rotatable by a second operating element is coaxial with the forward shift drum. Each of the shift drums includes lead grooves or slots which are at least partially overlapping. A single common shift fork pin engages the lead groove in each shift drum to control the movement of a shift fork attached thereto.

Accordingly, it is an object of the present invention to provide an improved transmission with a reverse mechanism. It is also an object of the invention to provide a transmission which is compact and lightweight. Other and further objects and advantages will appear hereinafter.

BRIEF DESCRIPTION OF THE DRAWINGS

In the drawings, wherein similar reference characters denote similar elements throughout the several views.

DETAILED DESCRIPTION OF THE PREFERRED EMBODIMENT

Figure 1:
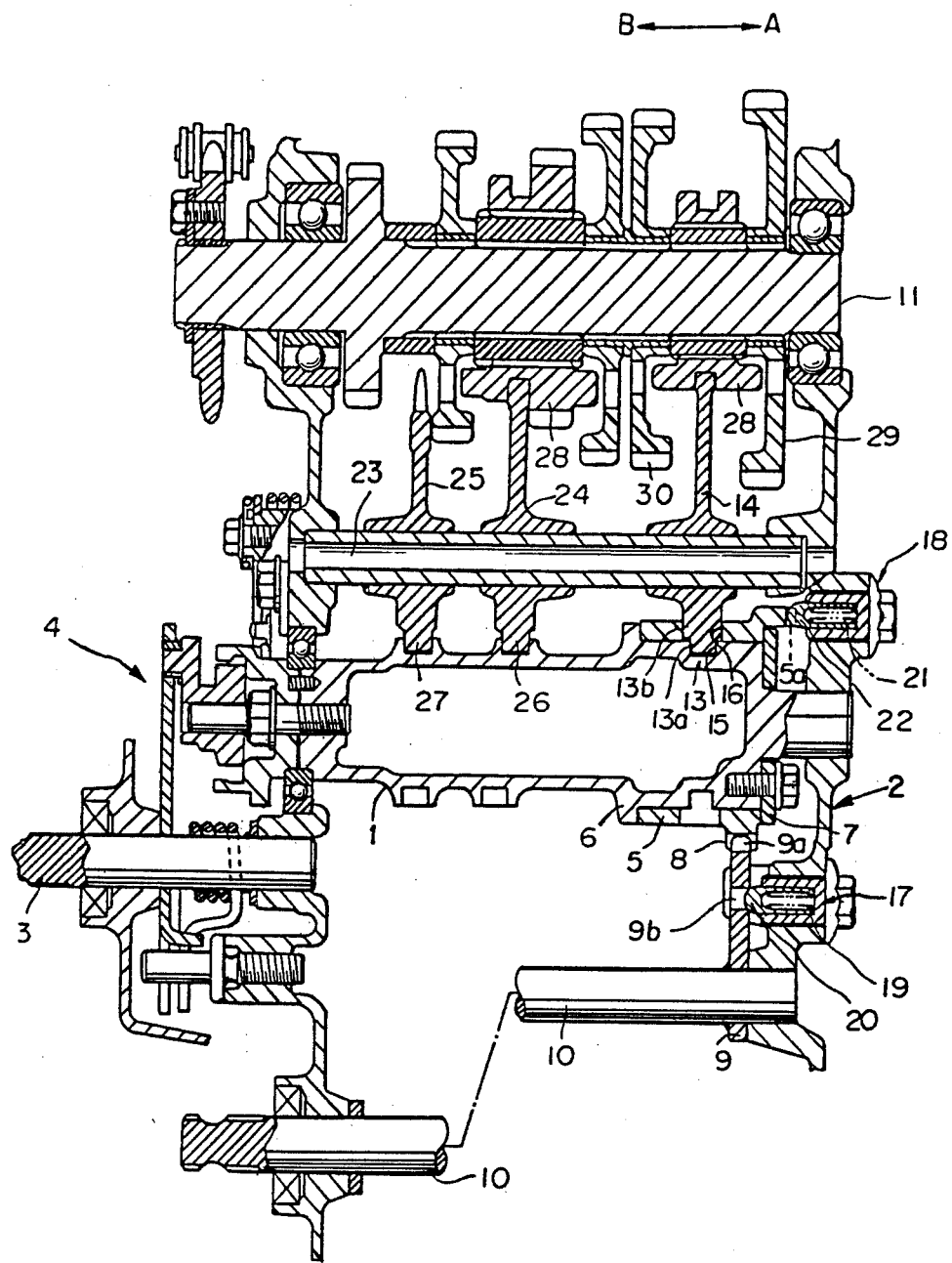
FIG. 1 is a fragmentary side view in part section illustrating the transmission of the present invention.

Turning in detail to the drawings, FIG. 1 illustrates a section of a transmission according to the present invention, wherein a forward shift drum 1 is rotatably mounted on a transmission case 2. A forward shift spindle 3 is disposed parallel to the forward shift drum 1 and is actuated through a shift pedal (not shown). The forward shift drum 1 is rotated about its longitudinal axis, step by step, via a step change mechanism 4. The forward shift drum 1 rotates in either direction in response to the operation of the first step change mechanism 4 as actuated by the vehicle operator.

A reverse shift drum 5 is rotatably mounted onto one end of the forward shift drum 1, and is coaxial therewith. The reverse shift drum 5 is held at one end against an integral flange 6 protruding radially outwardly around the forward shift drum 1. The other end of the reverse shift drum 5 is clamped by a plate 7 fastened to the forward shift drum 1 with screws. In this way, the reverse shift drum 5 is longitudinally locked into position and is prevented from undergoing any axial longitudinal movement relative to the forward shift drum 1. However, the reverse shift drum 5 remains free to rotate with respect to the forward shift drum 1.

The reverse shift drum 5 includes an integral gear portion 8 at the outer periphery of its proximal end. A shift arm 9 has a gear 9a in mesh with the gear portion 8 of the reverse shift drum 5. The shift arm 9 is secured to a shift spindle 10 extending parallel to the longitudinal access of the two shift drums 1 and 5. The shift spindle 10 is operated by a second step change mechanism (not shown) in the manner as the first step change mechanism 4.

The transmission also includes a detent or stop 17 mounted onto the transmission case 2 adjacent to the shift arm 9. A pin 20 is biased by a spring 19 acting between the stop 17 and the pin 20. The outer end of the pin 20 engages an aperture 9b passing through the shift arm 9, thereby releasably retaining the shift arm 9 in place and preventing chattering due to vibration.

The reverse shift drum 5 includes a similar stop configuration. A pin 22 is biased by a spring 21 disposed in between a stop 18 and the pin 22. One end of the pin 22 is engaged in a recess formed in the end of the reverse shift drum 5. As with shift arm 9, the pin 22 holds the reverse shift drum 5 in place and prevents chattering of the drum due to vibration.

Figure 2:
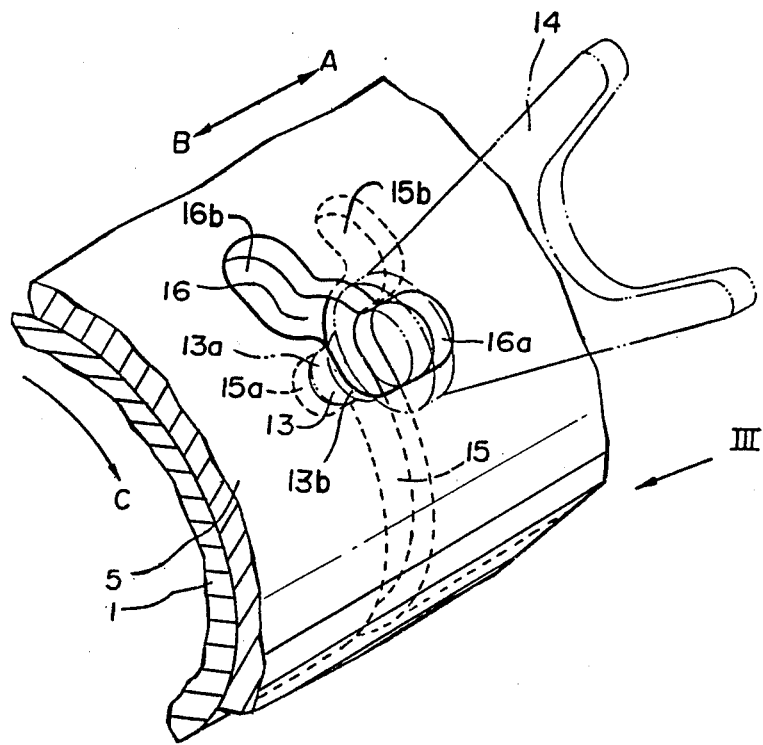
FIG. 2 is an enlarged fragmentary prospective view of the shift drums and the shift fork pin of the transmission of FIG. 1.

Turning now to FIG. 2, lead grooves 15 and 16 are formed in the shift drums 1 and 5, respectively, and overlap each other. The upper end 15b of the lead groove 15 in the forward shift drum 1 is inclined toward a first end of the drum. The upper end 16b of the lead groove 16 in the reverse shift drum 5 is inclined in the opposite direction i.e. toward a second end of the drum. The lead groove 16 in the overlying reverse shift drum 5 extends through the drum, i.e. through the peripheral wall thereof. In addition. the lead grooves 15 and 16 include relief sections 15a and 16a, respectively, extending longitudinally in opposite directions, relief section 15a extending toward the second end, and relief section 16a extending toward the first end.

As also shown on FIG. 2, a pin 13 integral with a shift fork 14 protrudes into grooves 16 and 15. The pin 13 of the shift fork 14 has a reduced diameter end portion 13a which is received into the lead groove 15 in the forward shift drum 1. The pin 13 also includes an initial section 13b having a larger diameter, and which is received in the lead groove 16 formed in the reverse shift drum 5.

Referring once more to FIG. 1, a shift fork supporting shaft 23 is disposed parallel to the shift drums 1 and 5. Shift forks 14, 24, and 25 are arranged on the shaft 23, and are displaceable therealong in the longitudinal direction, i.e. in the direction indicated by arrows A and B. The shift forks 14, 24, and 25 include integral following pins 13, 26, and 27, respectively. These following pins protrude into lead grooves formed in the peripheries of the shift drums 1 and 5, as is well known in the art. When the shift drums 1 and 5 are rotated, the shift forks 14, 24, and 25 are shifted in the direction indicated by arrows A and B via the guidance or tracking of the pins along their respective lead grooves in the shift drums. Gear shifters 28 are engaged with the shift forks 14, 24, and 25, respectively, and are shifted longitudinally by the shifters and brought into meshing engagement with gears 29 and 30, respectively, disposed adjacent thereto, so that the intended gear is drivingly coupled to the drive shaft 11.

Figure 3:
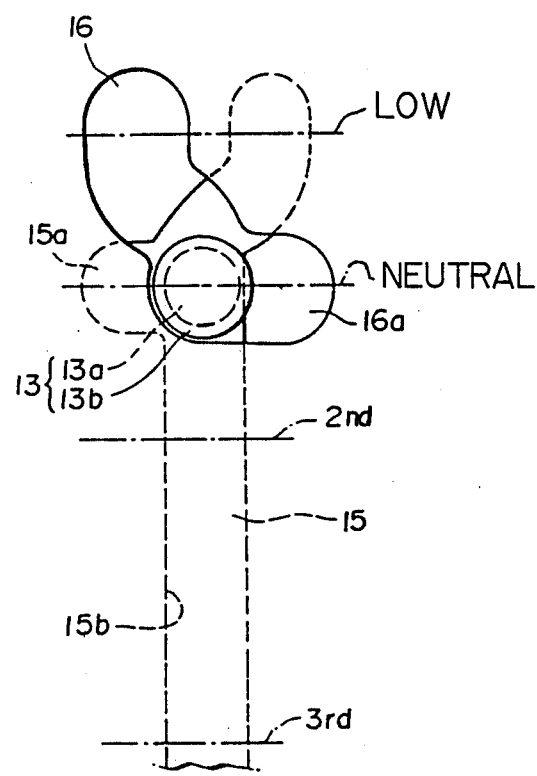
FIG. 3 is a schematically illustrated front elevational view of the lead grooves illustrated in FIG. 2.
Figure 4:
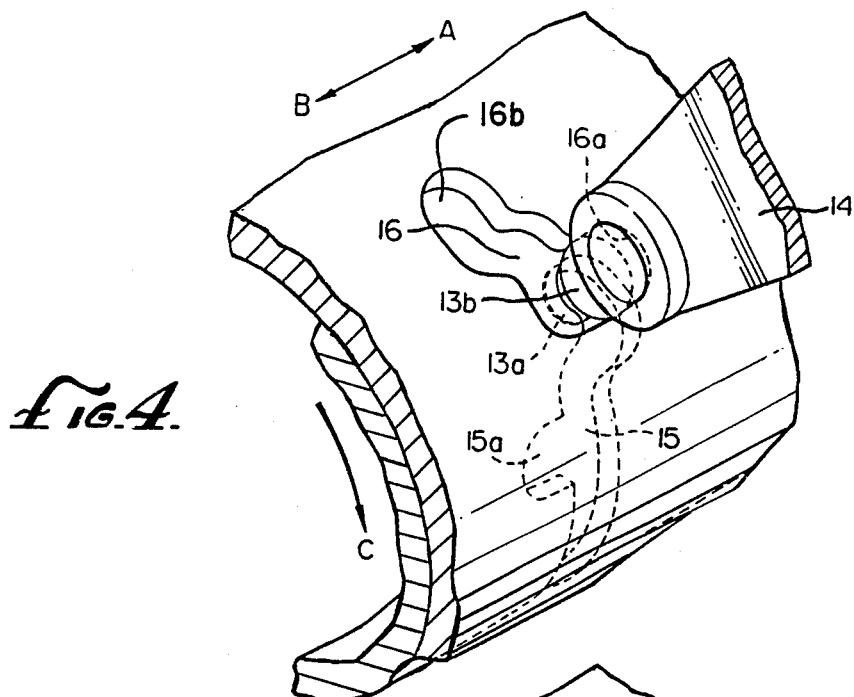
FIG. 4 is an enlarged fragmentary prospective view of the shift drums and shift fork pin of FIG. 2 illustrating the position of the elements with the transmission engaged into a forward gear.

Turning now to the operation of the transmission, FIGS. 2 and 3 illustrate the relative positions of the shift drums 1 and 5, as well as the pin 13 and the shift fork 14, when the transmission is in the neutral position. When the transmission is to be shifted from the neutral position into low or first gear, the clutch (not shown) is first disengaged, and then the first step change mechanism (also not shown) is actuated to rotate the shift spindle 3 which thereby rotates the forward shift drum 1 in the direction indicated by arrow C in FIG. 2. As a result, the reduced diameter end 13a of the shift fork pin 13 is guided into the inclined end 15b of the lead groove 15, in the direction of arrow A, as illustrated in FIG. 2 and FIG. 4. The shift fork 14 and the shifter 28 engage therewith or move in the same direction, so that the shifter 28 is brought into meshing engagment with the low gear 29 disposed adjacent to the proximal side thereof. The power of the drive shaft 11 is then transmitted to a drive wheel via the low gear 29.

With the transmission in this position, i.e., in low or first gear, if the rotation of the reverse shift drum 5 is attempted by actuating the second step change mechanism joined to the reverse shift spindle 10, the reverse shift drum 5 will not be rotated since the larger diameter section or shoulder 13b of the shift fork pin 13 is disposed in the relief portion 16a of the lead groove 16 of the reverse shift drum 5. As a result, the side wall of the relief section 16a acts as a stop and prevents the reverse shift drum 5 from rotating. This prevents engagement of the reverse gear while first gear is still engaged, thereby avoiding possible damage to the transmission.

Shifting the transmission from the neutral position to the low position, or shifting from the neutral position to second, third, fourth and fifth gear and vice versa is effected by actuating the first step change mechanism to rotate the forward shift drum 1 in a conventional manner. During shifting between any two of the gears 2 through 5, the reverse shift drum 5 cannot be rotated to engage the reverse gear 30 with the drive shaft even if the reverse gear operating system is activated. This is because the shift fork pin 13 is abutted against the distal side wall 15b (see FIG. 3) of the lead groove 15 of the forward shift drum 1 and the side wall 15b acts as a stop.

Figure 5:
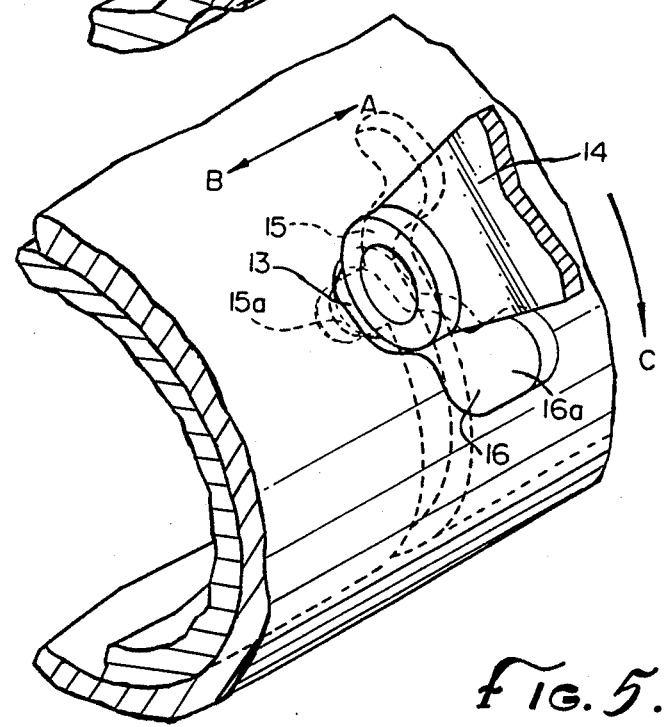
FIG. 5 is an enlarged fragmentary prospective view of the shift drums and shift fork pin of FIG. 2 illustrating the position of the elements with the transmission engaged in the reverse gear.

When the transmission is to be shifted from the neutral position to the reverse position, the clutch is disengaged and the reverse shift drum 5 is rotated in the direction of arrow C (see FIG. 2) by means of the shift spindle 10. The shift spindle 10 is actuated by the second (reverse) step change mechanism. This causes the larger diameter section 13b of the shift fork pin 13 to be guided in the direction of arrow B into the inclined end portion 16b of the lead groove 16 in the reverse shift drum 5, as shown in FIG. 5. The shift fork 14 and the shifter 28 engaged therewith move in the same direction. Thus the shifter 28 is brought into meshing engagement with the reverse gear 30 disposed adjacent thereto. The power of the drive shaft 11 is then transmitted to the drive wheel via the reverse gear 30.

With the transmission engaged in the reverse gear, the forward shift drum 1 cannot be rotated by operating the first (forward) step change mechanism. The forward shift drum 1 will not rotate as the pin 13 is disposed in the relief section 15a of the lead groove 15 of the forward shift drum 1. This acts as a stop to prevent the engagement of a forward gear when the reverse gear is still engaged.

Although in the embodiment shown and described, the reverse shift drum 5 is surrounding or overlying the forward shift drum 1, the shift drums may be modified and reversed in position so that the forward shift drum 1 is fitted over the reverse shift drum 5. In addition, although the lead groove 16 of the reverse shift drum 5 has been illustrated and described as intersecting the low gear lead groove 15 of the forward shift drum 1, other embodiments are possible, for example wherein the lead groove 16 of the reverse shift drum 5 intersects another lead groove.

Thus, a transmission is disclosed wherein a common shift fork pin is receive in the forward and reverse lead grooves of forward and reverse shift drums. When one of the lead grooves displaces the pin, the other lead groove serves as a stop. As a result, the unintentional or accidental engagement of gears is prevented without the use of a separate special lock mechanism. Thus, a compact and lightweight design is provided. In addition, since the two shift drums are disposed in a coaxial and overlapping relation, the overall size of the transmission can be reduced by comparison with transmissions wherein the shift drums are separately supported. Moreover, as only one support shaft is required, rather than two as in previous transmissions, the weight of the present transmission is further reduced.

While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A transmission having forward gears and a reverse gear, comprising
    a forward shift drum having a forward gear lead groove therein;
    a reverse shift drum concentrically arranged with said forward shift drum, said reverse shift drum being rotatable relative to and axially fixed relative to said forward shift drum, said reverse shift drum having a reverse gear lead groove therein overlapping said forward gear lead groove; and
    a shift fork pin for one of the forward gears and the reverse gear being engaged in said forward and reverse lead grooves.

2. The transmission of claim 1 wherein said pin has a reverse gear position, a forward gear position displaced axially along said shift drums from said reverse gear position and a neutral position between said reverse gear position and said forward gear position, said reverse gear lead groove extending from said neutral position of said pin axially in a first direction on said reverse shift drum to said forward gear position of said pin and extending both axially in the opposite direction and circumferentially on said reverse shift drum from said neutral position of said pin to said reverse gear position of said pin.

3. The transmission of claim 2 wherein said forward gear lead groove extends on said forward shift drum both axially and circumferentially from said neutral position of said pin to said forward gear position of said pin and axially on said forward shift drum from said neutral position of said pin to said reverse gear position of said pin such that said forward gear lead groove and said reverse gear lead groove cross at said neutral position of said pin.

4. The transmission of claim 2 wherein said extension of said reverse gear lead groove to said forward gear position of said pin has axially extending sides on said reverse shift drum.

5. The transmission of claim 3 wherein said extension of said forward gear lead groove to said reverse gear position of said pin includes axially extending sides on said forward shift drum.

6. The transmission of claim 3 wherein said forward gear lead groove extends circumferentially about a portion of said forward shift drum at said neutral position of said pin.

* * * * *